US007680288B2

(12) United States Patent
Melchior et al.

(10) Patent No.: US 7,680,288 B2
(45) Date of Patent: *Mar. 16, 2010

(54) APPARATUS AND METHOD FOR GENERATING, STORING, OR EDITING AN AUDIO REPRESENTATION OF AN AUDIO SCENE

(75) Inventors: Frank Melchior, Ilmenau (DE); Jan Langhammer, Ilmenau (DE); Thomas Roeder, Reckhausen (DE); Katrin Reichelt, Ilmenau (DE); Sandra Brix, Ilmenau (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 1617 days.

This patent is subject to a terminal disclaimer.

(21) Appl. No.: 10/912,276

(22) Filed: Aug. 4, 2004

(65) Prior Publication Data

US 2005/0105442 A1 May 19, 2005

(30) Foreign Application Priority Data

Aug. 4, 2003 (EP) ................................ 03017785
Sep. 25, 2003 (DE) ................................ 103 44 638

(51) Int. Cl.
*H04B 1/00* (2006.01)
*G06F 17/00* (2006.01)
*G11B 3/74* (2006.01)

(52) U.S. Cl. ............................ 381/119; 700/94; 369/5; 369/91

(58) Field of Classification Search .................. 700/94; 381/17, 18, 119; 369/4-5, 86-87, 91-92
See application file for complete search history.

(56) References Cited

U.S. PATENT DOCUMENTS 6,054,989 A * 4/2000 Robertson et al. ........... 715/848

(Continued)

FOREIGN PATENT DOCUMENTS

EP 1 209 949 5/2002

(Continued)

OTHER PUBLICATIONS

Roland, VS-1680 Owner's Manual, 1998, Roland, 1-19, 27-29, 31, 40, 45, 182-184.*

(Continued)

*Primary Examiner*—Curtis Kuntz
*Assistant Examiner*—Jesse A Elbin
(74) *Attorney, Agent, or Firm*—Michael A. Glenn; Glenn Patent Group

(57) ABSTRACT

An apparatus for generating, storing or editing an audio representation of an audio scene includes audio processing means for generating a plurality of speaker signals from a plurality of input channels as well as means for providing an object-oriented description of the audio scene, wherein the object-oriented description of the audio scene includes a plurality of audio objects, wherein an audio object is associated with an audio signal, a starting time instant and an end time instant. The apparatus for generating further distinguishes itself by mapping means for mapping the object-oriented description of the audio scene to the plurality of input channels, wherein an assignment of temporally overlapping audio objects to parallel input channels is performed by the mapping means, whereas temporally sequential audio objects are associated with the same channel. With this, an object-oriented representation is transferred into a channel-oriented representation, whereby on the object-oriented side the optimal representation of a scene may be used, whereas on channel-oriented side the channel-oriented concept users are used to may be maintained.

3 Claims, 4 Drawing Sheets

U.S. PATENT DOCUMENTS

| | | | | |
|---|---|---|---|---|
| 7,085,387 | B1 * | 8/2006 | Metcalf | 369/5 |
| 2003/0035553 | A1 * | 2/2003 | Baumgarte et al. | 381/94.2 |
| 2003/0095669 | A1 * | 5/2003 | Belrose et al. | 381/56 |

FOREIGN PATENT DOCUMENTS

| | | |
|---|---|---|
| GB | 2 349 762 | 11/2000 |
| JP | A 1279700 | 11/1989 |
| JP | A 4225700 | 8/1992 |
| JP | A 6246064 | 9/1994 |
| JP | A 7184300 | 7/1995 |

OTHER PUBLICATIONS

Berkhout, A. *A Holographic Approach to Acoustic Control*. Dec. 1988. J. Audio Eng. Soc. vol. 36. No. 12.

Berkhout, A., et al. *Acoustic control by Wave Field Synthesis*. May 1993. The Journal of the Acoustical Society of America. No. 5.

* cited by examiner

FIG 2
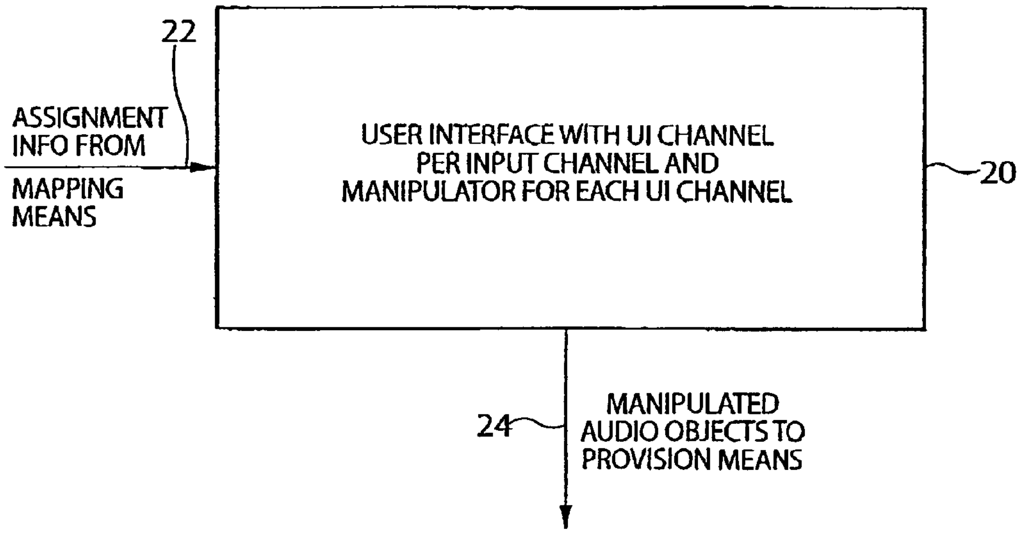
FIG 3A
(ONLY CURRENT OBJECTS)
FIG 3B
(ALL OBJECTS IN THE INPUT CHANNEL)
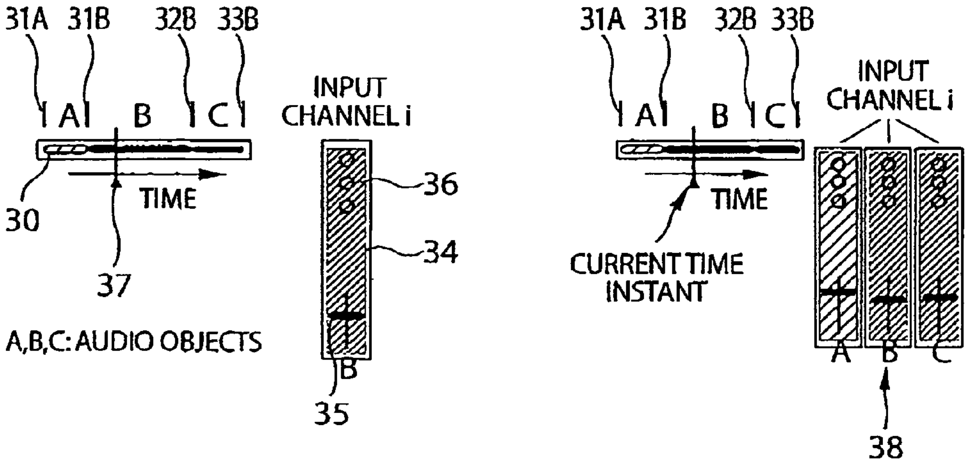

| CHANNEL | AUDIO OBJECT | AUDIO OBJECT |
|---|---|---|
| Ek1 | A | A E F |
| Ek2 | B | B (E) (F) G |
| Ek3 | C | C (F) (G) |
| Ek4 | D | D (G) |
| Ek5 | E | |
| Ek6 | F | |
| Ek7 | G | |
| | 1:1 CONVERSION | ASSIGNMENT "OBJECT-CHANNEL" |

APPARATUS AND METHOD FOR GENERATING, STORING, OR EDITING AN AUDIO REPRESENTATION OF AN AUDIO SCENE

BACKGROUND OF THE INVENTION

CROSS-REFERENCE TO RELATED APPLICATION

This application claims priority from German Patent Application No. 10344638.9, which was filed on Sep. 25, 2003, and from European Patent Application No. 03017785.1, which was filed on Aug. 4, 2002, and which are incorporated herein by reference in their entirety.

1. Field of the Invention

The present invention lies on the field of the wave-field synthesis and, in particular, relates to apparatuses and methods for generating, storing, or editing an audio representation of an audio scene.

2. Description of the Related Art

There is an increasing need for new technologies and innovative products in the area of entertainment electronics. It is an important prerequisite for the success of new multimedia systems to offer optimal functionalities or capabilities. This is achieved by the employment of digital technologies and, in particular, computer technology. Examples for this are the applications offering an enhanced close-to-reality audiovisual impression. In previous audio systems, a substantial disadvantage lies in the quality of the spatial sound reproduction of natural, but also of virtual environments.

Methods of multi-channel speaker reproduction of audio signals have been known and standardized for many years. All usual techniques have the disadvantage that both the site of the speakers and the position of the listener are already impressed on the transfer format. With wrong arrangement of the speakers with reference to the listener, the audio quality suffers significantly. Optimal sound is only possible in a small area of the reproduction space, the so-called sweet spot.

A better natural spatial impression as well as greater enclosure or envelope in the audio reproduction may be achieved with the aid of a new technology. The principles of this technology, the so-called wave-field synthesis (WFS), have been studied at the TU Delft and first presented in the late 80s (Berkout, A. J.; de Vries, D.; Vogel, P.: Acoustic control by Wave-field Synthesis. JASA 93, 993).

Due to this method's enormous requirements for computer power and transfer rates, the wave-field synthesis has up to now only rarely been employed in practice. Only the progress in the area of the microprocessor technology and the audio encoding do permit the employment of this technology in concrete applications today. First products in the professional area are expected next year. In a few years, first wave-field synthesis applications for the consumer area are also supposed to come on the market.

The basic idea of WFS is based on the application of Huygens' principle of the wave theory:

Each point caught by a wave is starting point of an elementary wave propagating in spherical or circular manner.

Applied on acoustics, every arbitrary shape of an incoming wave front may be replicated by a large amount of speakers arranged next to each other (a so called speaker array). In the simplest case, a single point source to be reproduced and a linear arrangement of the speakers, the audio signals of each speaker have to be fed with a time delay and amplitude scaling so that the radiating sound fields of the individual speakers overlay correctly. With several sound sources, for each source the contribution to each speaker is calculated separately and the resulting signals are added. If the sources to be reproduced are in a room with reflecting walls, reflections also have to be reproduced via the speaker array as additional sources. Thus, the expenditure in the calculation strongly depends on the number of sound sources, the reflection properties of the recording room, and the number of speakers.

In particular, the advantage of this technique is that a natural spatial sound impression across a great area of the reproduction space is possible. In contrast to the known techniques, direction and distance of sound sources are reproduced in a very exact manner. To a limited degree, virtual sound sources may even be positioned between the real speaker array and the listener.

Although the wave-field synthesis functions well for environments whose properties are known, irregularities occur if the property changes or the wave-field synthesis is executed on the basis of an environment property not matching the actual property of the environment.

The technique of the wave-field synthesis, however, may also be advantageously employed to supplement a visual perception by a corresponding spatial audio perception. Previously, in the production in virtual studios, the conveyance of an authentic visual impression of the virtual scene was in the foreground. The acoustic impression matching the image is usually impressed on the audio signal by manual steps in the so-called postproduction afterwards or classified as too expensive and time-intensive in the realization and thus neglected. Thereby, usually a contradiction of the individual sensations arises, which leads to the designed space, i.e. the designed scene, to be perceived as less authentic.

Generally speaking, the audio material, for example to a movie, consists of a multiplicity of audio objects. An audio object is a sound source in the movie setting. Thinking of a movie scene, for example, in which two persons are standing opposing each other and are in dialog, and at the same time e.g. a rider and a train approach, for a certain time a total of four sound sources exist in this scene, namely the two persons, the approaching rider, and the train driving up. Assuming that the two persons in dialog do not talk at the same time, at one time instant at least two audio objects should at least be active, namely the rider and the train, when at this time instant both persons are silent. If one person, however, talks at another time instant, three audio objects are active, namely the rider, the train and the one person. If the two persons actually were to speak at the same time, at this time instant four audio objects are active, namely the rider, the train, the first person, and the second person.

Generally speaking, an audio object represents itself such that the audio object describes a sound source in a movie setting, which is active or "alive" at a certain time instant. This means that an audio object is further characterized by a starting time instant and an end time instant. In the previous example, the rider and the train are, for example, active during the entire setting. When both approach, the listener will perceive this by the sounds of the rider and the train becoming louder and—in an optimal wave-field synthesis setting—the positions of these sound sources also changing correspondingly, if applicable. On the other hand, the two speakers being in dialog constantly produce new audio objects, because always when one speaker stops talking, the current audio object is at an end, and when the other speaker starts talking a new audio object is started, which again is at an end when the other speaker stops talking, wherein when the first speaker again starts talking a new audio object is again started.

There are existing wave-field synthesis rendering means capable of generating a certain amount of speaker signals from a certain amount of input channels, namely knowing the individual positions of the speakers in a wave-field synthesis speaker array.

The wave-field synthesis renderer is in a way the “heart” of a wave-field synthesis system, which calculates the speaker signals for the many speakers of the speaker array amplitude and phase-correctly, so that the user does not only have an optimal optical impression but also an optimal acoustic impression.

Since the introduction of multi-channel audio in movies in the late 60s it has always been the aim of the sound engineer to give the listener the impression that they are really involved in the scene. The adding of a surround channel to the reproduction system has been a further landmark. New digital systems followed in the 90s, which led to the number of audio channels having been increased. Nowadays, 5.1 or 7.1 systems are standard systems for movie reproduction.

In many cases these systems have to turned out as good potential for creatively supporting the perception of movies and provide good possibilities for sound effects, atmospheres, or surround-mixed music. On the other hand, the wave-field synthesis technology is so flexible that it provides maximal freedom in this respect.

But the use of 5.1 or 7.1 systems has led to several “standardized” ways to handle the mixing of movie sound tracks.

Reproduction systems usually have fixed speaker positions, such as in the case of 5.1 the left channel (“left”), the center channel (“center”), the right channel (“right”), the surround left channel (“surround left”), and the surround right channel (“surround right”). As a result of these fixed (few) positions, the ideal sound image the sound engineer is looking for is limited to a small amount of seats, the so-called sweet spot. The use of phantom sources between the above-referenced 5.1 positions does in certain cases lead to improvements, but not always to satisfactory results.

The sound of a movie usually consists of dialogs, effects, atmospheres, and music. Each of these elements is mixed taking into account the limitations of 5.1 and 7.1 systems. Typically, the dialog is mixed in the center channel (in 7.1 systems also to a half left and a half right position). This implies that when the actor moves across the screen, the sound does not follow. Movement sound object effects can only be realized when they move quickly, so that the listener is not capable of recognizing when the sound transitions from one speaker to the other.

Lateral sources also cannot be positioned due to the large audible gap between the front and the surround speakers, so that objects cannot move slowly from rear to front and vice versa.

Furthermore, surround speakers are placed in a diffuse array of speakers and thus generate a sound image representing a kind of envelope for the listener. Hence, accurately positioned sound sources behind the listener are avoided in order to avoid the unpleasant sound interference field accompanying such accurately positioned sources.

The wave-field synthesis as a completely new way for constructing the sound field perceived by a listener overcomes these substantial shortcomings. The consequence for movie theater applications is that an accurate sound image may be achieved without limitations regarding two-dimensional positioning of objects. This opens up a large multiplicity of possibilities in designing and mixing sound for movie theater purposes. Because of the complete sound image reproduction achieved by the technique of the wave-field synthesis, sound sources may now be positioned freely. Furthermore, sound sources may be placed as focused sources within the listeners’ space as well as outside the listeners’ space.

Moreover, stable sound source directions and stable sound source positions may be generated using point-shaped radiating sources or plane waves. Finally, sound sources may be moved freely within, outside or through the listeners’ space.

This leads to an enormous potential of creative possibilities and also to the possibility to place sound sources accurately according to the image on the screen, for example for the entire dialog. With this, it indeed becomes possible to imbed the listener into the movie not only visually but also acoustically.

Due to historical circumstances, the sound design, i.e. the activity of the sound recordist, is based on the channel or track paradigm. This means that the encoding format or the number of speakers, i.e. 5.1 systems or 7.1 systems, determine the reproduction setup. In particular, a particular sound system also requires a particular encoding format. As a consequence, it is impossible to perform any changes regarding the master file without again performing the complete mixing. It is, for example, nor possible to selectively change a dialog track in the final master file, i.e. to change it without also changing all other sounds in this scene.

On the other hand, a viewer/listener does not care about the channels. They do not care for which sound system a sound is generated, whether an original sound description has been present in an object-oriented manner, has been present in a channel-oriented manner, etc. The listener also does not care if and how an audio setting has been mixed. All that counts for the listener is the sound impression, i.e. whether they like a sound setting to a movie or a sound setting without a movie or not.

On the other hand, it is substantial that new concepts are accepted by the persons that are to work with the new concepts. The sound recordists are in charge of the sound mixing. Sound recordists are “calibrated” to work in a channel-oriented manner due to the channel-oriented paradigm. For them it is actually the aim to mix the six channels, for example for a movie theater with 5.1 sound system. This is not about audio objects, but about channel orientation. In this case, an audio object typically has no starting time instant or no end time instant. Instead, a signal for a speaker will be active from the first second of the movie until the last second of the movie. This is due to the fact that via one of the (few) speakers of the typical movie theater sound system always some sound will be generated, because there should always be a sound source radiating via the particular speaker, even if it is only background music.

For this reason, existing wave-field synthesis rendering units are used in that they work in a channel-oriented manner that they also have a certain amount of input channels from which, when the audio signals, along with associated information, are input in the input channels, the speaker signals for the individual speakers or speaker groups of a wave-field synthesis speaker array are generated.

On the other hand, the technique of the wave-field synthesis leads to an audio scene being substantially “more transparent” insofar as in principle an unlimitedly high amount of audio objects may be present viewed over a movie, i.e. viewed over an audio scene. With regard to channel-oriented wave-field synthesis rendering means, this may become problematic when the amount of the audio objects in the audio scene exceeds the typically always default maximum amount of input channels of the audio processing means. Moreover, for a user, i.e. for a sound recordist, for example, generating an audio representation of an audio scene, the multiplicity of audio objects, which in addition also exist at certain time instants and again do not exist at other time instants, i.e. which have a defined starting and a defined end time instant, will be confusing, which could again lead to a psychological threshold between the sound recordists and the wave-field synthesis, which is in fact supposed to bring sound recordists a significant creative potential, being constructed.

SUMMARY OF THE INVENTION

It is the object of the present invention to provide a concept for generating, storing, or editing an audio representation of an audio scene, which has high acceptance on the part of the users for whom corresponding tools are thought to be.

In accordance with a first aspect, the present invention provides an apparatus for generating, storing, or editing an audio representation of an audio scene, having an audio processor for generating a plurality of speaker signals from a plurality of input channels; a provider for providing an object-oriented description of the audio scene, wherein the object-oriented description of the audio scene includes a plurality of audio objects, wherein an audio object is associated with an audio signal, a starting time instant, and an end time instant; and a mapper for mapping the object-oriented description of the audio scene to the plurality of input channels of the audio processor, wherein the mapper is configured to assign a first audio object to an input channel, and to assign a second audio object whose starting time instant lies after the end time instant of the first audio object to the same input channel, and to assign a third audio object whose starting time instant lies after the starting time instant of the first audio object and before the end time instant of the first audio object to another of the plurality of input channels.

In accordance with a second aspect, the present invention provides a method of generating, storing, or editing an audio representation of an audio scene, with the steps of generating a plurality of speaker signals from a plurality of input channels; providing an object-oriented description of the audio scene, wherein the object-oriented description of the audio scene includes a plurality of audio objects, wherein an audio object is associated with an audio signal, a starting time instant, and an end time instant; and mapping the object-oriented description of the audio scene to the plurality of input channels of the audio processor by assigning a first audio object to an input channel, and by assigning a second audio object whose starting time instant lies after the end time instant of the first audio object to the same input channel, and by assigning a third audio object whose starting time instant lies after the starting time instant of the first audio object and before the end time instant of the first audio object to another of the plurality of input channels.

In accordance with a third aspect, the present invention provides a computer program with a program code for performing, when the program is executed on a computer, the method of generating, storing, or editing an audio representation of an audio scene, with the steps of generating a plurality of speaker signals from a plurality of input channels; providing an object-oriented description of the audio scene, wherein the object-oriented description of the audio scene includes a plurality of audio objects, wherein an audio object is associated with an audio signal, a starting time instant, and an end time instant; and mapping the object-oriented description of the audio scene to the plurality of input channels of the audio processor by assigning a first audio object to an input channel, and by assigning a second audio object whose starting time instant lies after the end time instant of the first audio object to the same input channel, and by assigning a third audio object whose starting time instant lies after the starting time instant of the first audio object and before the end time instant of the first audio object to another of the plurality of input channels.

The present invention is based on the finding that for audio objects, as they occur in a typical movie setting, solely an object-oriented description is processable in a clear and efficient manner. The object-oriented description of the audio scene with objects having an audio signal and associated with a defined starting and a defined end time instant corresponds to typical circumstances in the real world, in which it rarely happens anyway that a sound is there for the whole time. Instead, it is common, for example in a dialog, that a dialog partner begins talking and stops talking or that sounds typically have a beginning and an end. As far as that is concerned, the object-oriented audio scene description associating each sound source in real life with an object of its own is adapted to the natural circumstances and thus optimal regarding transparency, clarity, efficiency, and intelligibility.

On the other hand, e.g. sound recordists wanting to generate an audio representation from an audio scene, i.e. wanting to slip their creative potential in, to "synthesize" an audio representation of an audio scene in a movie theater maybe even taking into account special audio effects, due to the channel paradigm are typically used to working with either hardware or software-realized mixing desks, which are a consequent conversion of the channel-oriented working method. In hardware or software-realized mixing desks, each channel has regulators, buttons etc., with which the audio signal in this channel may be manipulated, i.e. "mixed".

According to the invention, a balance between the object-oriented audio representation doing justice to life and the channel-oriented representation doing justice to the sound recordist is achieved by a mapping means being employed to map the object-oriented description of the audio scene to a plurality of input channels of an audio processing means, such as a wave-field synthesis rendering unit. According to the invention, the mapping means is formed to assign a first audio object to an input channel and to assign a second audio object whose starting time instant lies after the end time instant of the first audio object to the same input channel, and to assign a third audio object whose starting time instant lies after the starting time instant of the first audio object and before the end time instant of the first audio object to another of the plurality of input channels.

This temporal assignment assigning concurrently occurring audio objects to different input channels of the wave-field synthesis rendering unit but assigning sequentially occurring audio objects to the same input channel has turned out to be extremely channel-efficient. This means that a relatively small number of input channels of the wave-field synthesis rendering unit is occupied on average, which on the one hand serves for clarity, and which on the other hand is convenient for the computing efficiency of the anyway very computation-intensive wave-field synthesis rendering unit. Due to the on average relatively small number of concurrently occupied channels, the user, i.e. for example the sound recordist, may get a quick overview of the complexity of an audio scene at a certain time instant, without having to look for, from a multiplicity of input channels, with difficulty which object is active at the moment or which object is not active at the moment. On the other hand, the user may perform manipulation of the audio objects as an object-oriented representation easily by his channel regulators he is used to.

This is expected to increase the acceptance of the inventive concept in that the users are supplied, with the inventive concept, with a familiar working environment, which however contains a far higher innovative potential. The inventive concept based on the mapping of the object-oriented audio approach into a channel-oriented rendering approach thus does justice to all requirements. On the one hand, the object-oriented description of an audio scene, as has been set forth, is best adapted to nature and thus efficient and clear. On the other hand, the habits and needs of the users are taken into account in that the technology complies with the users and not vice-versa.

BRIEF DESCRIPTION OF THE DRAWINGS

These and other objects and features of the present invention will become clear from the following description taken in conjunction with the accompanying drawings, in which:

FIG. 2 is a schematic illustration of a user interface for the concept shown in FIG. 1;

FIG. 3*a* is a schematic illustration of the user interface of FIG. 2 according to an embodiment of the present invention;

FIG. 3*b* is a schematic illustration of the user interface of FIG. 2 according to another embodiment of the present invention;

DESCRIPTION OF THE PREFERRED EMBODIMENTS

Figure 1:
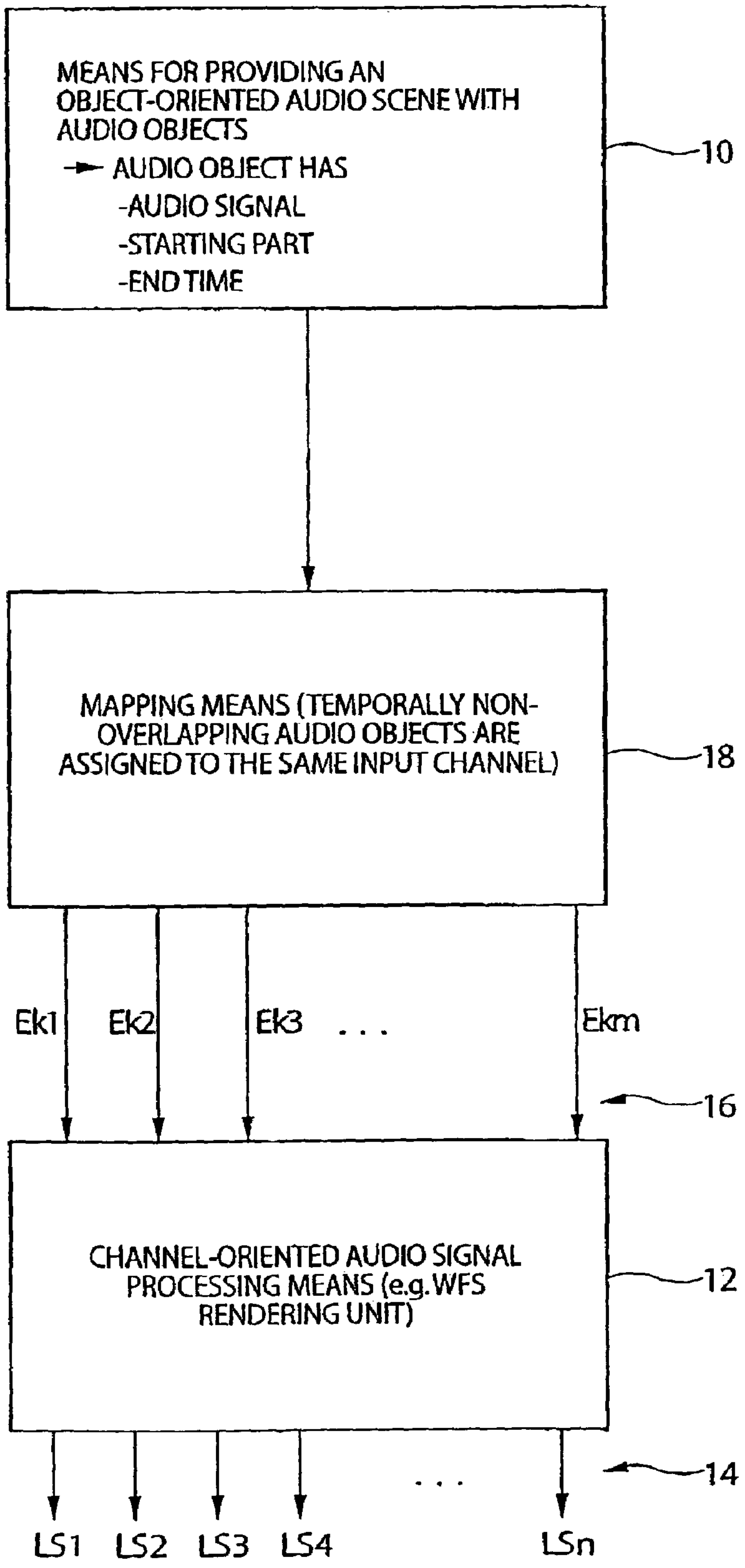
FIG. 1 is a block circuit diagram of the inventive apparatus for generating an audio representation.

FIG. 1 shows a block circuit diagram of an inventive apparatus for generating an audio representation of an audio scene. The inventive apparatus includes means 10 for providing an object-oriented description of the audio scene, wherein the object-oriented description of the audio scene includes a plurality of audio objects, wherein an audio object is associated with at least an audio signal, a starting time instant, and an end time instant. The inventive apparatus further includes audio processing means 12 for generating a plurality of speaker signals LSi 14, which is channel-oriented and generates the plurality of speaker signals 14 from a plurality of input channels EKi. Between the provision means 10 and the channel-oriented audio signal processing means, which is, for example, formed as WFS rendering unit, there are mapping means 18 for mapping the object-oriented description of the audio scene to a plurality of input channels 16 of the channel-oriented audio signal processing means 12, the mapping means 18 being formed to assign a first audio object to an input channel, such as EK1, and to assign a second audio object whose starting time instant lies after the end time instant of the first audio object to the same input channel, such as the input channel EK1, and to assign a third audio object whose starting time instant lies after the starting time instant of the first audio object and before the end time instant of the first audio object to another input channel of the plurality of input channels, such as the input channels EK2. Mapping means 18 is thus formed to assign temporally non-overlapping audio objects to the same input channel and to assign temporally overlapping audio objects to different parallel input channels.

In a preferred embodiment, in which the channel-oriented audio signal processing means 12 includes a wave-field synthesis rendering unit, the audio objects are also specified in that they are associated with a virtual position. This virtual position of an object may change during the life of the object, which would correspond to the case in which, for example, a rider approaches a scene midpoint, such that the gallop of the rider becomes louder and louder and, in particular, comes closer and closer to the audience space. In this case, an audio object does not only include the audio signal associated with this audio object and a starting time instant and an end time instant, but in addition also a position of the virtual source, which may change over time, as well as further properties of the audio object, if applicable, such as whether it should have point source properties or should emit a plane wave, which would correspond to a virtual position with infinite distance to the viewer. In technology, further properties for sound sources, i.e. for audio objects, are known, which may be taken into account depending on equipment of the channel-oriented audio signal processing means 12 of FIG. 1.

According to the invention, the structure of the apparatus is hierarchically constructed, such that the channel-oriented audio signal processing means for receiving audio objects is not directly combined with the means for providing but is combined therewith via the mapping means. This leads to the fact that the entire audio scene is to be known and stored only in the means for providing, but that already the mapping means and even less so the channel-oriented audio signal processing means have to have knowledge of the entire audio setting. Instead, both the mapping means 18 and the audio signal processing means 12 work under the instruction of the audio scene supplied from the means 10 for providing.

In a preferred embodiment of the present invention, the apparatus shown in FIG. 1 is further provided with a user interface, as it is shown in FIG. 2 at 20. The user interface 20 is formed to have a user interface channel per input channel as well as preferably a manipulator for each user interface channel. The user interface 20 is coupled to the mapping means 18 via its user interface input 22 in order to obtain the assignment information from the mapping means, since the occupancy of the input channels EK1 to EKm is to be displayed by the user interface 20. On the output side, the user interface 20, when having the manipulator feature for each user interface channel, is coupled to the means 10 for providing. In particular, the user interface 20 is formed to provide manipulated audio objects 24 regarding the original version to the means 10 for providing, which thus obtains an altered audio scene, which is then again provided to the mapping means 18 and—correspondingly distributed to the input channels—to the channel-oriented audio signal processing means 12.

Depending on implementation, the user interface 20 is formed as user interface, as illustrated in FIG. 3*a*, i.e. as user interface always illustrating only the current objects. Alternatively, the user interface 20 is configured to be constructed as in FIG. 3*b*, i.e. so that all objects in an input channel are always illustrated. Both in FIG. 3*a* and in FIG. 3*b*, a time line 30 is illustrated including in chronological order the objects A, B, C, wherein the object A includes a starting time instant 31*a* and an end time instant 31*b*. In a random manner, in FIG. 3*a* the end time instant 31*b* of the first object A coincides with a starting time instant of the second object B, which again has an end time instant 32*b*, which again coincides with a starting time instant of the third object C in a random manner, which again has an end time instant 33*b*. The starting time instants correspond to the end time instants 31*b* and 32*b* and are not illustrated in FIG. 3*a*, 3*b* for clarity reasons.

In the mode shown in FIG. 3*a*, in which only current objects are displayed as user interface channel, a mixing desk channel symbol 34 is illustrated on the right in FIG. 3*a*, which includes a slider 35 as well as stylized buttons 36, via which properties of the audio signal of the object B or also virtual positions etc. may be changed. As soon as the time mark in FIG. 3*a*, which is illustrated with 37, reaches the end time instant 32*b* of the object B, the stylized channel illustration 34 would not display the object B, but the object C. The user interface in FIG. 3*a*, when, for example, an object D would take place concurrently with object B, would illustrate a further channel such as the input channel i+1. The illustration shown in FIG. 3*a* provides the sound recordist an easy overview of the number of parallel audio objects at a time instant, i.e. the number of active channels displayed at all. Non-active input channels are not at all displayed in the embodiment of the user interface 20 of FIG. 2 shown in FIG. 3*a*.

In the embodiment shown in FIG. 3*b*, in which all objects in an input channel are displayed next to each other, display of non-occupied input channels also does not take place. Nevertheless, the input channel i to which the channels temporally assigned in chronological order belong is illustrated three times, namely once as object channel A, another time as object channel B, and yet another time as object channel C. According to the invention it is preferred to highlight the channel, such as the input channel i for the object B (reference numeral 38 in FIG. 3*b*), for example in color or in brightness, in order to give the sound recordist a clear overview of which object is currently being fed on the channel i involved on the one hand, and which objects, for example, run on this channel earlier or later, so that the sound recordist may already looking ahead to the future manipulate the audio signal of an object via this channel regulator or channel switch via the corresponding software or hardware regulators. The user interface 20 of FIG. 2 and, in particular, the embodiments thereof in FIG. 3*a* and FIG. 3*b* are thus formed to provide a visual illustration as desired for the "occupation" of the input channels of the channel-oriented audio signal processing means, which is generated by the mapping means 18.

Figures 5, 6:
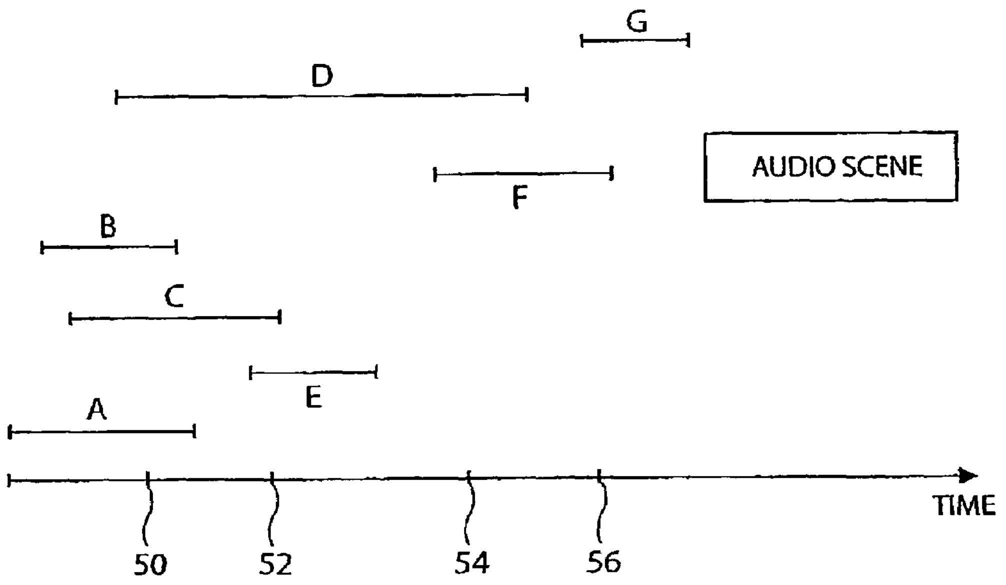
FIG. 5 is a time illustration of the audio scene with various audio objects.
FIG. 6 is a comparison of a 1:1 conversion between object and channel and an object-channel assignment according to the present invention for the audio scene illustrated in FIG. 5

Subsequently, with reference to FIG. 5, a simple example of the functionality of the mapping means 18 of FIG. 1 is given. FIG. 5 shows an audio scene with various audio objects A, B, C, D, E, F, and G. It can be seen, that the objects A, B, C, and D overlap temporally. In other words, these objects A, B, C, and D are all active at a certain time instant 50. On the other hand, the object E does not overlap with the objects A, B. The object E only overlaps with the objects D and C, as can be seen at time instant 52. Again overlapping is the object F and the object D, as can be seen at a time instant 54, for example. The same applies for the objects F and G, which, for example overlap at a time instant 56, whereas the object G does not overlap with the objects A, B, C, D, and E.

A simple and in many ways disadvantageous channel association would be to assign each audio object to an input channel in the example shown in FIG. 5, so that the 1:1 conversion on the left in the table in FIG. 6 would be obtained. Disadvantageous in this concept is the fact that many input channels are required or that when many audio objects are present, which is very quickly the case in a movie, the number of input channels of the wave-field synthesis rendering unit limits the number of processable virtual sources in a real movie setting, which is, of course, not desired, since technology limits are not supposed to impede the creative potential. On the other hand, this 1:1 conversion is very unclear in that some time typically each input channel obtains an audio object, but that when a particular audio scene is considered, typically relatively few input channels are active, that the user, however, may not easily assert this, since he always has to have all audio channels in overview.

Moreover, this concept of the 1:1 assignment of audio objects to input channels of the audio processing means leads to the fact that in the interest of an as low as possible or non-existing limitation of the number of audio objects audio processing means have to be provided, which have a very high number of input channels, which leads to an immediate increase in the computation complexity, the required computing power, and the required storage capacity of the audio processing means, to calculate the individual speaker signals, which immediately results in a higher price of such a system.

The inventive assignment object-channel of the example shown in FIG. 5, as it is achieved by the mapping means 18 according to the present invention, is illustrated in FIG. 6 in the right area of the table. Thus, the parallel audio objects A, B, C, and D are successively assigned to the input channels EK1, EK2, EK3, and EK4, respectively. The object E does not have to be assigned to the input channel EK5, as in the left half of FIG. 6, but may be assigned to a free channel, such as the input channel EK1 or, as suggested by the bracket, the input channel EK2. The same applies for the object F, which in principle may be assigned to all channels except the input channel EK4. The same applies for the object G, which also may be assigned to all channels except the channel to which the object F has been assigned before (in the example the input channel EK1).

In a preferred embodiment of the present invention, the mapping means 18 is formed to always occupy channels with an ordinal number as low as possible and to always, if possible, occupy adjacent input channels EKi and EKi+1, so that no holes arise. On the other hand, this "neighborhood feature" is not substantial, because it means nothing to a user of the audio author system according to the present invention whether he is just operating the first or the seventh or any other input channel of the audio processing means, as long as he is enabled by the inventive user interface to manipulate exactly this channel, for example by a regulator 35 or by buttons 36 of a mixing desk channel illustration 34 of the just current channel. Thus, the user interface channel i does not necessarily have to correspond to the input channel i, but a channel assignment may take place such that the user interface channel i, for example, corresponds to the input channel EKm, whereas the user interface channel i+1 corresponds to the input channel k etc.

With this, it is avoided by the user interface channel remapping that there are channel holes, i.e. that the sound recordist can always immediately and clearly see the current user interface channels illustrated next to each other.

The inventive concept of the user interface may, of course, also be transferred to an existing hardware mixing console, which includes actual hardware regulators and hardware buttons, which a sound recordist will operate manually to achieve an optimal audio mix. An advantage of the present invention is that such a hardware mixing console the sound recordist is typically very familiar with and that means a lot to him may also be used by always the just current channels being clearly marked for the sound recordist, for example by indicators typically present on the mixing console, such as LEDs.

The present invention is further flexible in that it can also be dealt with cases in which the wave-field synthesis speaker setup used for production deviates from the reproduction setup, e.g. in a movie theater. Thus, according to the invention, the audio content is encoded in a format that can be rendered by various systems. This format is the audio scene, i.e. the object-oriented audio representation and not the speaker signal representation. As far as that is concerned, the rendition method is understood as adaptation of the content to the reproduction system. According to the invention, nor only a few master channels but an entire object-oriented scene description is processed in the wave-field synthesis reproduction process. The scenes are rendered for each reproduction. This is typically performed in real time to achieve adaptation to the current situation. Typically, this adaptation takes into account the number of speakers and their positions, the characteristics of the reproduction system, such as the frequency response, the sound pressure level etc., the room acoustic conditions, or further image reproduction conditions.

One main difference of the wave-field synthesis mix as compared to the channel-based approach of current systems lies in the freely available positioning of the sound objects. In usual reproduction systems based on stereophony principles, the position of the sound sources is encoded relatively. This is important for mixing concepts belonging to a visual content, such as, for example, movies, because it is attempted to approximate positioning of the sound sources with reference to the image by a correct system setup.

The wave-field synthesis system, however, requires absolute positions for the sound objects, which are given as additional information to the audio signal of an audio object with this audio object in addition to also the starting time instant and the end time instant of this audio object.

In the conventional channel-oriented approach, the basic idea was to reduce the number of tracks in several pre-mix passes. These pre-mix passes are organized in categories, such as dialogue, music, sound, effects, etc. During the mixing process, all required audio signals are fed in the mixing console and mixed at the same time by different sound engineers. Each pre-mix reduces the number of tracks until only one track per reproduction speaker exists. These final tracks form the final master file (final master).

All relevant mixing tasks, such as equalization, dynamics, positioning, etc., are performed at the mixing desk or with the use of special additional equipment.

The aim of the re-engineering of the postproduction process is to minimize the user training and to integrate the integration of the new inventive system into the existing knowledge of the users. In the wave-field synthesis application of the present invention, all tracks or objects to be rendered at different positions will exist within the master file/distribution format, which is in contrast to conventional production facilities, which are optimized in that they reduce the number of tracks during the production process. On the other hand, it is necessary for practical reasons to give the re-recording engineer the possibility to use the existing mixing console for wave-field synthesis productions.

Thus, according to the invention, current mixing consoles are used for the conventional mixing tasks, wherein the output of these mixing consoles is then introduced into the inventive system for generating an audio representation of an audio scene, where the spatial mixing is performed. This means that the wave-field synthesis author tool according to the present invention is implemented as work station, which has the possibility to record the audio signals of the final mix and convert them to a distribution format in another step. For this, according to the invention, two aspects are taken into account. The first is that all audio objects or tracks still exist in the final master. The second aspect is that the positioning is not performed in the mixing console. This means that the so-called authoring, i.e. the sound recordist postprocessing, is one of the last steps in the production chain. According to the invention, the wave-field synthesis of a system, according to the present invention, i.e. the inventive apparatus for generating an audio representation, is implemented as stand-alone workstation, which may be integrated into different production environments by feeding audio outputs from a mixing desk into the system. As far as that is concerned, the mixing desk represents the user interface coupled to the apparatus for generating the audio representation of an audio scene.

Figure 4:
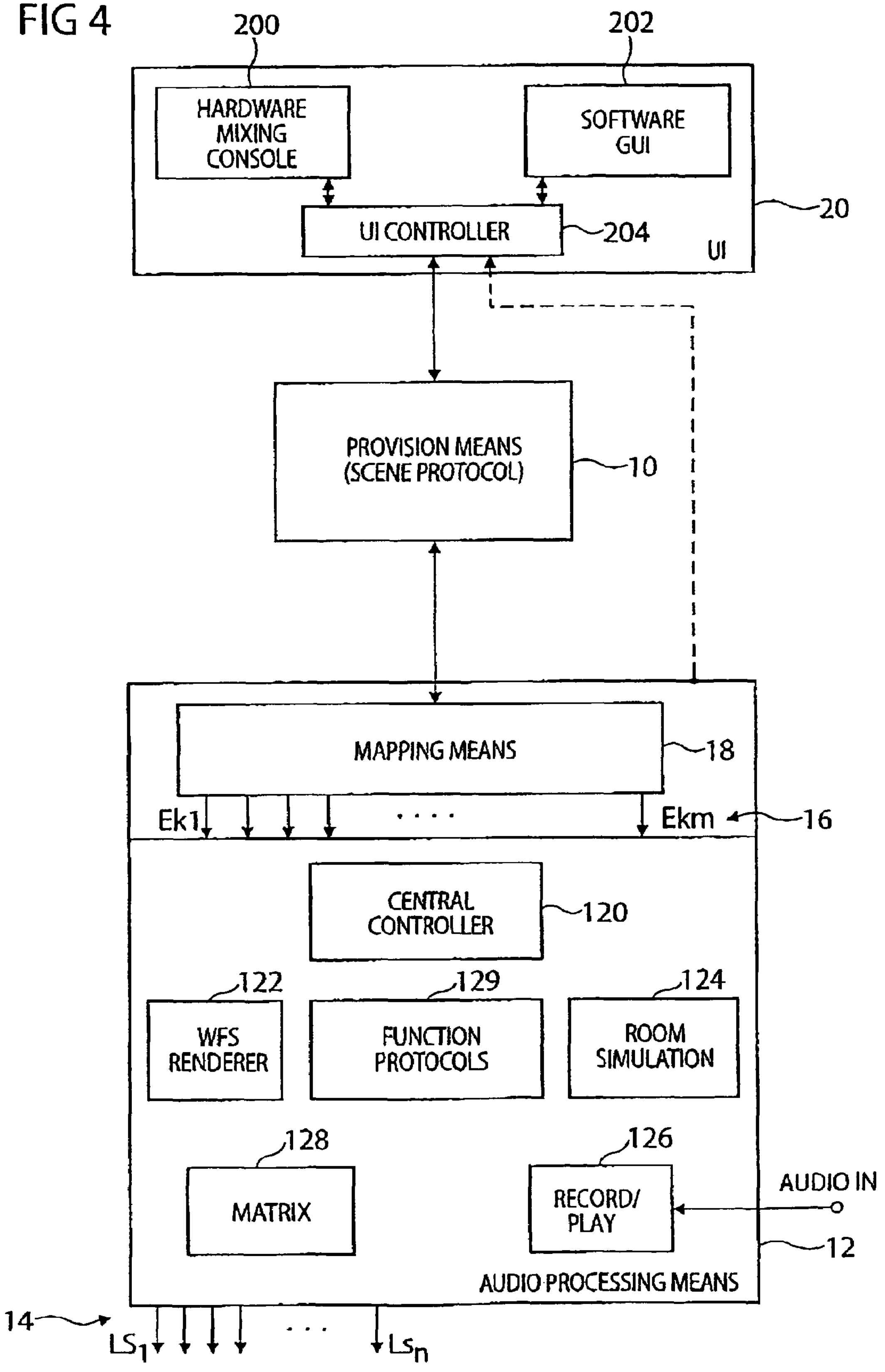
FIG. 4 is a block circuit diagram of an inventive apparatus according to a preferred embodiment.

The inventive system according to a preferred embodiment of the present invention is illustrated in FIG. 4. Like reference numerals as in FIG. 1 or 2 indicate like elements. The basic system design is based on the aim of the modularity and the possibility to integrate existing mixing consoles into the inventive wave-field synthesis author system as user interfaces.

For this reason, a central controller 120 communicating with other modules is formed in the audio processing means 12. This enables the use of alternatives for certain modules as long as all use the same communication protocol. If the system shown in FIG. 4 is regarded as black box, in general a number of inputs (from the provision means 10) and a number of outputs (speaker signals 14) as well as the user interface 20 can be seen. Integrated in this black box next to the user interface, there is the actual WFS renderer 122, which performs the actual wave-field synthesis computation of the speaker signals using diverse input information. Furthermore, a room simulation module 124 is provided, which is formed to perform certain room simulations used to generate room properties of a recording room or to manipulate room properties of a recording room.

Furthermore, audio recording means 126 as well as record play means (also 126) are provided. Means 126 is preferably provided with an external input. In this case, the entire audio signal is provided and fed in an already object-oriented manner or in a still channel-oriented manner. Then, the audio signals do not come from the scene protocol, which then only observes control tasks. The audio data fed in is then converted to an object-based representation from means 126, if necessary, and then internally fed to the mapping means 18, which then performs the object/channel mapping.

All audio connections between the modules are switchable by a matrix module 128, to connect corresponding channels to corresponding channels depending on request by the central controller 120. In a preferred embodiment, the user has the possibility to feed 64 input channels with signals for virtual sources into the audio processing means 12, thus, 64 input channels EK1-EKm exist in this embodiment. With this, existing consoles may be used as user interfaces for pre-mixing the virtual source signals. The spatial mixing is then performed by the wave-field synthesis author system, and, in particular, by the heart, the WFS renderer 122.

The complete scene description is stored in the provision means 10, which is also designated as scene protocol. The main communication or the required data traffic, however, is performed by the central controller 120. Changes in the scene description, as may be achieved, for example, by the user interface 20 and, in particular, by the hardware mixing console 200 or a software GUI, i.e. a software graphical user interface 202, are supplied to the provision means 10 as altered scene protocol via a user interface controller 204. By provision of an altered scene protocol, the entire logic structure of a scene is uniquely illustrated.

For the realization of the object-oriented solution approach, each sound object is associated with a rendition channel (input channel) by the mapping means 18, in which the object exists for a certain time. Usually a number of objects exists in chronological order on a certain channel, as has been illustrated on the basis of FIGS. 3*a*, 3*b*, and 6. Although the inventive author system supports this object orientation, the wave-field synthesis renderer itself does not have to know the objects. It simply receives signals in the audio channels and a description of the way in which these channels have to be rendered. The provision means with the scene protocol, i.e. with the knowledge of the objects and the associated channels, may perform a transform of the object-related meta data (for example the source position) to channel-related meta data and transfer them to the WFS renderer 122. The communication between other modules is performed by special protocols in a way that the other modules only contain necessary information, as it is schematically illustrated by the block function protocols 129 in FIG. 4.

The inventive control module also supports the hard disc storage of the scene description. It preferably distinguishes between two file formats. One file format is an author format, where the audio data are stored as compressed PCM data. Furthermore, session-related information, such as a grouping of audio objects, i.e. of sources, layer information, etc., is also used to be stored in a special file format based on XML.

The other type is the distribution file format. In this format, audio data may be stored in a compressed manner, and here is no need to additionally store the session-related data. It should be noted that the audio objects still exist in this format and that the MPEG-4 standard may be used for distribution. According to the invention, it is preferred to always do the wave-field synthesis rendition in real time. This enables that no pre-rendered audio information, i.e. already finished speaker signals, has to be stored in any file format. This is of great advantage insofar as the speaker signals may take up very significant amounts of data, which is not at last to be attributed to the multiplicity of speakers used in a wave-field synthesis environment.

The one or more wave-field synthesis renderer modules 122 are usually supplied with virtual source signals and a channel-oriented scene description. A wave-field synthesis renderer calculates the drive signal according to the wave-field synthesis theory for each speaker, i.e. a speaker signal of the speaker signals 14 of FIG. 4. The wave-field synthesis renderer will further calculate signals for subwoofer speakers, which are also required in order to support the wave-field synthesis system at low frequencies. Room simulation signals from the room simulation module 124 are rendered using a number (usually 8 to 12) of static plane waves. Based on this concept, it is possible to integrate different solution approaches for the room simulation. Without use of the room simulation module 124, the wave-field synthesis system already generates acceptable sound images with stable perception of the source direction for the listening area. There are, however, certain deficiencies with regard to the perception of the depth of the sources, since usually no early space reflections or reverberations are added to the source signals. According to the invention, it is preferred that a room simulation module is employed, which reproduces wall reflections, which are, for example, modeled in that a mirror source model is employed for the generation of the early reflections. These mirror sources may again be treated as audio objects of the scene protocol or, in fact, only be added by the audio processing means itself. The recording/play tools 126 represent a useful supplement. Sound objects, which are finished for the mixing in a conventional way during the pre-mixing in that only the spatial mixing still has to be performed, may be fed from the conventional mixing desk to an audio object reproduction device. Furthermore, it is preferred to have also an audio recording module recording the output channels of the mixing desk in a time code controlled manner and storing the audio data at the reproduction module. The reproduction module will receive a starting time code to play a certain audio object, namely in connection with a respective output channel supplied to the reproduction device 126 from the rendition means 18. The recording/play device may start and stop the playing of individual audio objects independently of each other, depending on description of the starting time instant and stop time instant associated with an audio object. As soon as the mixing procedure is finished, the audio content may be taken from the reproduction device module and exported into the distribution file format. The distribution file format thus contains a finished scene protocol of a ready-mixed scene. The aim of the inventive user interface concept is to implement a hierarchic structure, which is adapted to the tasks of the movie theater mixing process. Here, an audio object is taken as source existing as representation of the individual audio object for a given time. A starting time and a stop/end time are typical for a source, i.e. for an audio object. The source or the audio object requires resources of the system during the time in which the object or the source "lives".

Preferably, each sound source, apart from the starting time and the stop time, also includes meta data. These meta data are "type" (at a certain time instant a plane wave or a point source), "direction", "volume", "muting", and "flags" for a direction-dependent loudness and a direction-dependent delay. All these meta data may be used in an automated manner.

Furthermore, it is preferred that in spite of the object-oriented solution approach the inventive author system also serves the conventional channel concept in that, for example, objects that are "alive" through the entire movie or in general through the entire scene also get a channel of their own. This means that these objects in principle represent simple channels in 1:1 conversion, as it is set forth on the basis of FIG. 6.

In a preferred embodiment of the present invention, at least two objects may be grouped. For each group it is possible to select which parameters are to be grouped and in which way they are to be calculated using the master of the group. Groups of sound sources exist for a given time, which is defined by the starting time and the end time of the members.

An example for the utility of groups consists in using them for virtual standard surround setups. These could be used for the virtual fading-out of a scene or the virtual zooming-in into a scene. Alternatively, the grouping may also be used to integrate surround reverberations and to record a WFS mix.

Furthermore, it is preferred to form a further logic entity, namely the layer. In order to structure a mix or a scene, in a preferred embodiment of the present invention, groups and sources are arranged in different layers. Using layers, pre-dubs may be simulated in the audio workstation. Layers may also be used to change display attributes during the author process, such as to display or to hide different parts of the current mixing subject.

A scene consists of all previously discussed components for a given time duration. This time duration could be a film spool or also, for example, the entire movie, or only, for example, a movie portion of certain duration, such as five minutes. The scene again consists of a number of layers, groups, and sources, which belong to the scene.

Preferably, the complete user interface 20 should include both a graphics software part and a hardware part to enable haptic control. Although this is preferred, the user interface, however, could also be completely implemented as software module for cost reasons.

A design concept for the graphical system is used, which is based on so-called "spaces". In the user interface, there exists a small number of different spaces. Each space is a special editing environment showing the project from a different approach, wherein all tools are available that are required for a space. Hence, various windows do no longer have to be paid attention at. All tools required for an environment are in the corresponding space.

In order to give the sound engineer an overview of all audio signals at a given time instant, the adaptive mixing space already described on the basis of FIGS. 3*a* and 3*b* is used. It can be compared with a conventional mixing desk only displaying the active channels. In the adaptive mixing space, instead of the mere channel information, also audio object information is presented. These objects are, as has been illustrated, associated with input channels of the WFS rendering unit by the mapping means 18 of FIG. 1. Apart from the adaptive mixing space, also the so-called timeline space exists, which provides an overview of all input channels. Each channel is illustrated with its corresponding objects. The user has the possibility to use the object-to-channel association, although an automatic channel association is preferred for simplicity reasons.

Another space is the positioning and editing space, which shows the scene in a three-dimensional view. This space is to enable the user to record or edit movements of the source objects. Movements may be generated using a joystick or using other input/display devices, for example, as are known for graphical user interfaces.

Finally, a room space exists, which supports the room simulation module 124 of FIG. 4, to also provide a room editing possibility. Each room is described by a certain parameter set stored in a room default library. Depending on the room model, various kinds of parameter sets as well as various graphical user interfaces may be employed.

Depending on the conditions, the inventive method for generating an audio representation may be implemented in hardware or in software. The implementation may take place on a digital storage medium, in particular a floppy disk or CD with electronically readable control signals, which thus may cooperate with a programmable computer system so that the inventive method is executed. The invention thus also consists in a computer program product with a program code stored on a machine-readable carrier for the performance of the inventive method, when the computer program product runs on a computer. In other words, the invention thus also is a computer program with a program code for the performance of the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for generating, storing, or editing an audio representation of an audio scene, comprising:

an audio processor for generating a plurality of speaker signals from a plurality of input channels;

a provider for providing an object-oriented description of the audio scene, wherein the object-oriented description of the audio scene includes a plurality of audio objects, wherein an audio object is associated with an audio signal, a starting time instant, and an end time instant; and a mapper for mapping the object-oriented description of the audio scene to the plurality of input channels of the audio processor, wherein the mapper is configured to assign a first audio object to an input channel, and to assign a second audio object whose starting time instant lies after the end time instant of the first audio object to the same input channel, and to assign a third audio object whose starting time instant lies after the starting time instant of the first audio object and before the end time instant of the first audio object to another of the plurality of input channels, wherein the audio processor is coupled to the provider exclusively via the mapper, to receive audio object data to be processed.

2. A method of generating, storing, or editing an audio representation of an audio scene, comprising:

generating, by an audio processor, a plurality of speaker signals from a plurality of input channels;

providing, by a provider, an object-oriented description of the audio scene, wherein the object-oriented description of the audio scene includes a plurality of audio objects, wherein an audio object is associated with an audio signal, a starting time instant and an end time instant; and mapping, by a mapper, the object-oriented description of the audio scene to the plurality of input channels by assigning a first audio object to an input channel, and by assigning a second audio object whose starting time instant lies after the end time instant of the first audio object to the same input channel, and by assigning a third audio object whose starting time instant lies after the starting time instant of the first audio object and before the end time instant of the first audio object to another of the plurality of input channels, wherein the audio processor is coupled to the provider exclusively via the mapper, to receive audio object data to be processed.

3. A computer readable medium with program code stored therein for performing a method of generating, storing, or editing an audio representation of an audio scene, the method comprising:

generating, by an audio processor, a plurality of speaker signals from a plurality of input channels;

providing, by a provider, an object-oriented description of the audio scene, wherein the object-oriented description of the audio scene includes a plurality of audio objects, wherein an audio object is associated with an audio signal, a starting time instant and an end time instant; and mapping, by a mapper, the object-oriented description of the audio scene to the plurality of input channels by assigning a first audio object to an input channel, and by assigning a second audio object whose starting time instant lies after the end time instant of the first audio object to the same input channel, and by assigning a third audio object whose starting time instant lies after the starting time instant of the first audio object and before the end time instant of the first audio object to another of the plurality of input channels, wherein the audio processor is coupled to the provider exclusively via the mapper, to receive audio object data to be processed.

* * * * *